United States Patent [19]

Hölter et al.

[11] 4,451,435

[45] May 29, 1984

[54] APPARATUS FOR CLEANING AIR LOADED WITH POLLUTANTS

[75] Inventors: Heinz Hölter, Beisenstr. 39-41, 4390 Gladbeck; Heinrich Igelbüscher, Gladbeck; Heinrich Gresch, Dortmund-Wickede; Heribert Dewert, Gladbeck, all of Fed. Rep. of Germany

[73] Assignee: Heinz Hölter, Gladbeck, Fed. Rep. of Germany

[21] Appl. No.: 387,853

[22] PCT Filed: Sep. 30, 1981

[86] PCT No.: PCT/EP81/00153

§ 371 Date: Jun. 4, 1982

§ 102(e) Date: Jun. 4, 1982

[87] PCT Pub. No.: WO82/01348

PCT Pub. Date: Apr. 29, 1982

[30] Foreign Application Priority Data

Oct. 17, 1980 [DE] Fed. Rep. of Germany ....... 3039238
Nov. 11, 1980 [DE] Fed. Rep. of Germany ....... 3042455
Jan. 31, 1981 [DE] Fed. Rep. of Germany ....... 3103302
Jan. 31, 1981 [DE] Fed. Rep. of Germany ....... 3103303
Jul. 9, 1981 [DE] Fed. Rep. of Germany ....... 3127129

[51] Int. Cl.³ ............................................. B01D 53/36
[52] U.S. Cl. .......................................... 422/171; 55/74; 55/267; 98/2.11; 165/61; 422/4; 422/173; 423/239; 423/244; 423/247

[58] Field of Search ............... 422/4, 5, 173, 122-125, 422/169-171; 98/2.11, 2.14, 2.15; 165/61, 64; 423/239, 244, 247; 55/267, 498, 74, 233; 261/DIG. 4, DIG. 17, 106, 158-161

[56] References Cited

U.S. PATENT DOCUMENTS

| 2,056,663 | 10/1936 | Foulke | 422/122 X |
| 3,348,830 | 10/1967 | Pearl et al. | 261/161 |
| 3,750,556 | 8/1973 | Duke et al. | 422/4 X |
| 3,804,942 | 4/1974 | Kato et al. | 422/122 X |
| 4,133,652 | 1/1979 | Ishikawa et al. | 422/4 X |
| 4,315,895 | 2/1982 | Bramer et al. | 422/171 |

FOREIGN PATENT DOCUMENTS

| 1095128 | 12/1960 | Fed. Rep. of Germany ...... 422/122 |
| 2416805 | 10/1975 | Fed. Rep. of Germany . |
| 2603750 | 8/1977 | Fed. Rep. of Germany . |
| 2908085 | 9/1980 | Fed. Rep. of Germany . |
| 2911428 | 10/1980 | Fed. Rep. of Germany . |

*Primary Examiner*—Richard L. Chiesa
*Attorney, Agent, or Firm*—Karl F. Ross; Herbert Dubno

[57] ABSTRACT

Air is fed to a cabin after having been purified to remove sulfur dioxide, nitrogen monoxide, nitrogen dioxide, carbon monoxide and hydrocarbons therefrom, e.g. to serve a space occupied by a human. According to the invention, an ozonizer is provided to generate ozone which is reacted with the sulfur dioxide and nitrogen monoxide to produce sulfur trioxide and nitrogen dioxide respectively. The pollutants are then taken up in part on sorption masses and the air is then heated before it is introduced into a catalyst mass wherein the carbon monoxide is reacted to form carbon dioxide. The carbon dioxide can then be absorbed and the purified air, after cooling, can be fed to the cabin.

15 Claims, 7 Drawing Figures

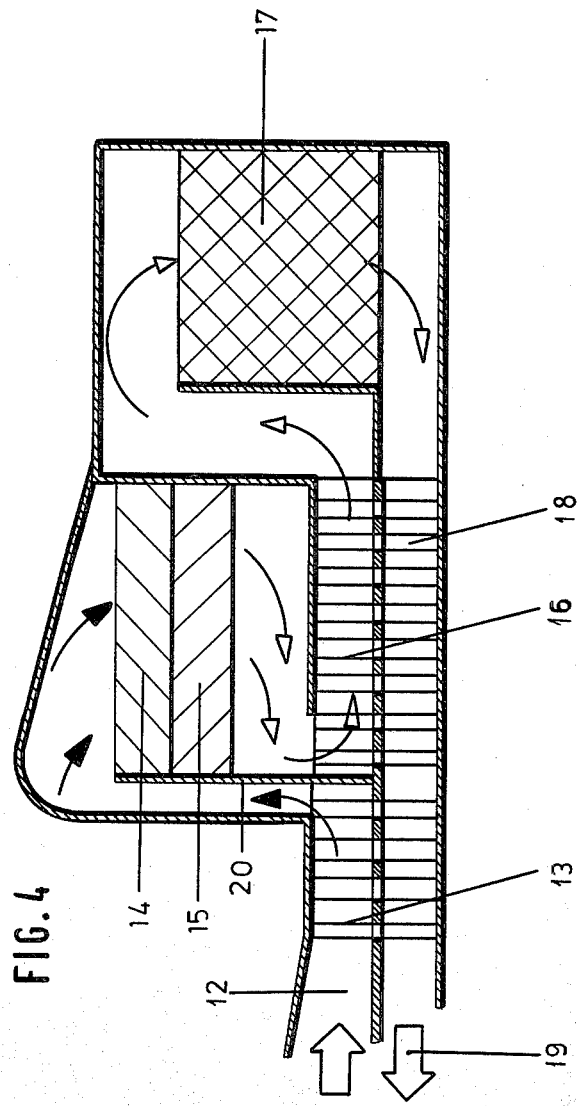

APPARATUS FOR CLEANING AIR LOADED WITH POLLUTANTS

CROSS REFERENCE TO RELATED APPLICATION

This application is a national phase application of Patent Cooperation Treaty application PCT/EP81/00153 filed Sept. 30, 1981 and based upon German application Nos. P 30 39 239.2 filed Oct. 17, 1980, P 30 42 455 filed Nov. 11, 1980, P 31 03 302.4 and P 31 03 303.2 of Jan. 31, 1981 and P 31 27 129.4 of July 9, 1981, under the International Convention.

FIELD OF THE INVENTION

The invention relates to a method of and to an apparatus for the cleaning of air loaded with pollutants, preferably for air fed to cabins or the like serving to provide shelter for persons by employing sorption and catalyst masses.

BACKGROUND OF THE INVENTION

It is known to rid the air from pollutants by way of absorption, adsorption and catalyst masses. Sorption masses depend for their capacity very much on the water vapor partial pressure and, in fact, the capacity of activated charcoal a number of materials difficult to dissolve in water drop if the relative humidity of the air is above 50 percent, such that in part materials absorbed in this range are already released again.

Catalyst masses become useless even at very small relative humidities. In order to protect catalyst masses against changes in humidity level they have to be heated up.

In a heated state, however, sorption masses and in particular absorption masses have poor sorption properties, or part of the sorbed pollutants can be released again. Thus a preheating of the air to be cleaned with simultaneous application of sorption and catalyst effective masses has proven to be unsuitable because of the counter production behavior, since the preheating did not lead to the desired success.

OBJECT OF THE INVENTION

It is an object of the invention to provide a method and a device for the purposes described, which can free air from pollutants with simultaneous application of sorption and catalyst masses while avoiding the above mentioned disadvantages, where in addition the sorption and catalyst masses have a comparably useful life.

SUMMARY OF THE INVENTION

In accordance with the method this is achieved by feeding, the air to be freed from pollutants initially at ambient temperature through chemisorption filter masses and freeing the air here from acid gases, hydrocarbons and solid dust particles and only then heating the air via a heating device to such an extent that the water vapor pressure of the air is sufficiently above the water pick-up point of the following catalyst masses for the transformation of carbon monoxide (CO), then passing the heated air through these masses into carbon dioxide ($CO_2$) and the air freed from pollutants after passing of the catalyst masses is fed to a cooling zone which cools the air to the extent necessary to serve people in the work place, for example of the industrial safety cabin or of the vehicle cabin.

According to the invention the air to be inhaled and to be freed from pollutants for the industial safety cabin is fed initially over a soda-lime layer for the preferred absorption of sulfur dioxide ($SO_2$), sulfur triooxide ($SO_3$), and nitrogen dioxide ($NO_2$).

A catalyst layer is disposed downstream as a second layer, which layer comprises hopcalite in order to transform the nitrogen monoxide (NO) not absorbed into nitrogen dioxide ($NO_2$), which is then absorbed by a third layer, an activated charcoal layer, which also absorbs the hydrocarbon compounds.

Then a fourth layer is disposed behind the activated charcoal layer and the fourth layer comprises a catalyst, which transforms carbon monoxide into carbon dioxide and the air is preferably heated before flowing through this catalyst layer, which preferably comprises hopcalite such that the air is cleaned without leaving humidity on the catalyst, for example hopcalite the product can serve as air to be inhaled or as purging air after having been cooled to a desired temperature. The heating and cooling are preferably provided by a Peltier-element.

Preferably, this arrangement of chemisorption masses according to the invention is substantially improved with respect to the life of these masses by a further invention feature, thus the air to be inhaled and to be freed from pollutants is ozonized for industrial safety cabins or for vehicle cabins before traversing chemisorption and contact layers, the acid components being oxidized such as nitrogen monoxide to nitrogen dioxide and sulfur dioxide to sulfur trioxide in order to then be absorbed in the following, initially disposed chemisorption layer of the soda-lime composition.

The ozonization is provided in the inflow before the first second or both chemisorption layers via an electrical voltage, whereby the air is ozonized by way of known methods according to the invention in this arrangement.

Because of this arrangement in particular at high loadings of nitrogen monoxide such as for example in the waste gas behind vehicles, where a very high nitrogen monoxide part is present and hardly any secondary air thinning effects are encountered for the person inhaling, instead of the above described hopcalite layer for the transformation of nitrogen oxide into nitrogen dioxide, this layer can be omitted or only employed as a very fine catalyst, such that on ozonization the transformation not only from nitrogen oxide to nitrogen dioxide occurs, but also from carbon monoxide into carbon dioxide.

In accordance with the invention, upon the application of selective absorption and adsorption layers also the corresponding heating of the air is to be performed, in part and adapted to the individual layers. Thus the inflow air is initially in part heated for the first chemisorption masses, for example by about 6 to 10 degrees centigrade, whereby a shifting of the relative humidity of for example from 80 to below 50 percent is effected.

By way of these further steps according to the invention useful life of for example the activated charcoal is substantially increased.

The further heating, for example to above 50 degrees centigrade for the transformation of carbon monoxide into carbon dioxide by the hopcalite catalyst masses, remains fully preserved, although, the life time of the total pack is substantially increased by this partial, intentional heating of the individual chemisorption masses.

According to the invention the air to be cleaned experiences initially a heating to 20 to 30 degrees centigrade, then is fed to the sorption masses, then is heated to 55 to 60 degrees centigrade, whereupon the air is fed to the catalyst masses, then is subjected to a cooling and the purified air is fed to further applications. In this method of operation an optimal cleaning effect is possible, since the air to be freed from pollutants in each case traverses the sorption and catalyst masses in the most favorable region of effectiveness with the result that these have high useful lifes. Advantageously, the air to be cleaned is heated before contacting the sorption masses to 25 degrees centigrade and before contacting the catalyst masses to 55 degrees centigrade.

Conventionally, the feed of purified outside air is provided by feeding the air sucked in from the outside via a purification and/or absorption apparatus into the cabin of for example a vehicle.

Thus the air to be purified is subjected to all climatic variations and has to be especially air-conditioned in order to free the driver from these variations.

It is known to insert sorption masses into the fresh air channels in order to keep out of the cabin region of the buses or of the truck the pollutants from vehicles driving in front.

However, a disadvantage has to be considered in that the various heavy weighing loads for the sorption masses such as rain, snow, ice and high humidity fully come through and make impossible the use of such packs.

This is proven in that there exists presently in world commerce no apparatus which fully satisfies the requirements.

With the present invention it is possible to feed to the driver a purified air freed from pollutants and taken out of the inner space of the vehicle such that the driver is in a clean air bell with its breathing region, which bell is not distinguished in climate from the regular interior climate of his work cabin.

By way of the disposition according to the invention of the sorption and catalyst pack, that is of the ventilation apparatus in the interior of the car, it is assured that the variable climatic conditions in the area outside of the vehicle do not negatively become effective.

This arrangement according to the invention results in the advantage that the driver is not subjected to different climatic loads and only the amount of air required for the breathing range of the driver is subjected to a special treatment.

This means that an apparatus can be made available for human occupation of a work place, which is small, economic and highly available.

The apparatus transforms the pollutants in the air comprising for example sulfur dioxide, nitrogen dioxide, nitrogen monoxide and hydrocarbons, with ozonized air into sulfur trioxide and nitrogen dioxide and removes the hydrocarbon compounds with the sorption masses. The ozonization of the air is added in a by-pass of the air volume to be cleaned and/or is performed directly via an ozonizer, which preferably effects the ozonization electrically. The ozonization apparatus is disposed at the required place, adapted to the requirement between the sorption masses, where preferably the air transformed with regard to nitrogen dioxide and carbon dioxide is warmed by a heater before flowing through the last hopcalite layer, such that the hopcalite layer does not become too wet as to be useless as a catalyst and the purified and heated air is then via a cooling zone cooled down to the desired inhaling or room air temperature and where preferably the heating and cooling unit is provided as a Peltier element.

According to a further feature of the invention the apparatus is provided with an entrance chamber for the air to be cleaned, which is provided with a heating device for the air passing through such that in each case in the flow direction of the air there follows a chamber provided with sorption masses, following to this chamber is a heating chamber provided with a heater device, next there follows a chamber provided with the catalyst, and thereafter there follows a chamber provided with a cooling device. Advantageously, all chambers are incorporated in a case (housing) such that in total there results a very compact construction. The air feed and the air discharge are disposed on one side of the case, such that the air passes through the complete case in counter current. The chambers with the sorption and the catalyst masses are disposed in one part of the case and the chambers with the heating and cooling devices are disposed in another, the previously mentioned neighboring part of the case. This way there results an immediate construction correspondence, such that in particular lines, channels and the like are to a large degree avoided, since an immediate streaming of the air from one chamber to the next is possible. The entrance chamber and the chamber with the sorption masses are separated from each other by way of a redirecting device, such that the air after its slight warming in the entrance chamber necessarily is fed to the chamber with the sorption masses. According to a further feature of the invention, the exit opening of the chamber with the sorption masses and the entrance opening of the chamber with the catalyst masses are disposed such that the air passes the heating device corresponding to these chambers in their total effective length, such that the air enters the chamber with the catalyst masses at a substantialy increased temperature. Advantageously, one or more Peltier cooling elements are employed as warming and cooling devices, which are for example provided with ribs at which the air to be warmed up or to be cooled down necessarily passes by.

According to a further feature of the invention, the Peltier elements are disposed such and the air stream is directed such that the air stream thermally successively passes over the hot sides of the Peltier elements and is in a counter current fed back via the cooling rows of the Peltier elements or respectively vice versa. With this construction the hottest heating side of the thermally successively disposed Peltier elements is opposed in each case to the warmest cold side, such that the temperature difference to be overcome by the Peltier elements is reduced to a minimum. Thus the Peltier elements can operate in their optimum operational range. At a heating up by for example 50 degrees centigrade, a Peltier element has to pump up against a temperature difference of 50 degrees centigrade. Since the degree of effectiveness of a heat pump is oppositely proportional to the temperature difference to be overcome, the degree of effectiveness proves to be comparatively poor. At an in principle known application of Peltier elements for the heating or cooling about 30 to 40 percent of the electrical power are used for generation of the heating or respectively cooling power. In contrast, this part can be increased to about 70 percent by way of the apparatus of the invention.

Advantageously, the Peltier elements are disposed in a joint housing such that in total a compact and easily manageable arrangement results. The case or housing is provided with ribs or the like such that the heat or cooling transfer are improved.

According to a further feature of the invention the case is provided with circulating devices or the like such that also a partial heating or cooling is possible for the passing air stream.

BRIEF DESCRIPTION OF THE DRAWING

Embodiments of the invention are illustrated in the drawing in which:

FIG. 4 is a sectional view of a device for stepwise heating and cooling of air to be cleaned;

SPECIFIC DESCRIPTION

Figure 1:
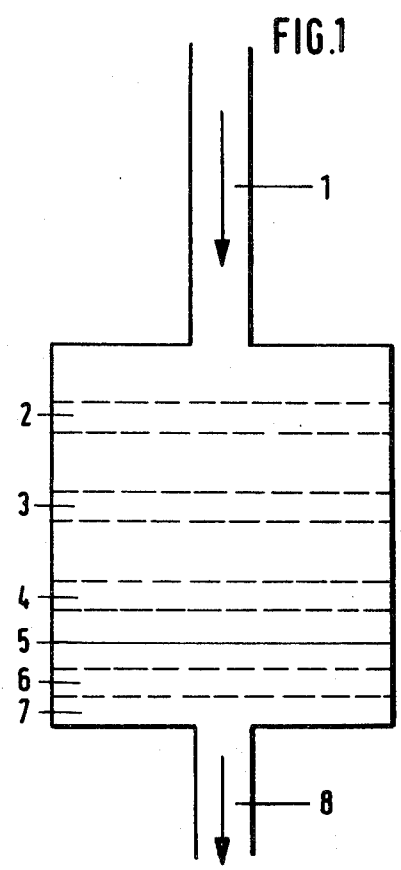
FIGS. 1 to 3 are diagrammatic sections showing various layers of an apparatus according to the invention.
Figure 3:
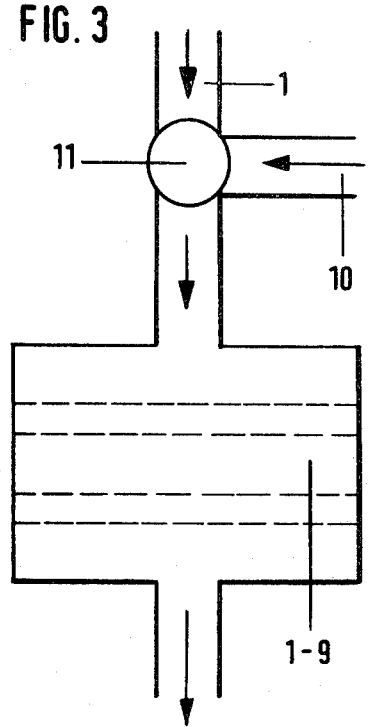
Figure 2:
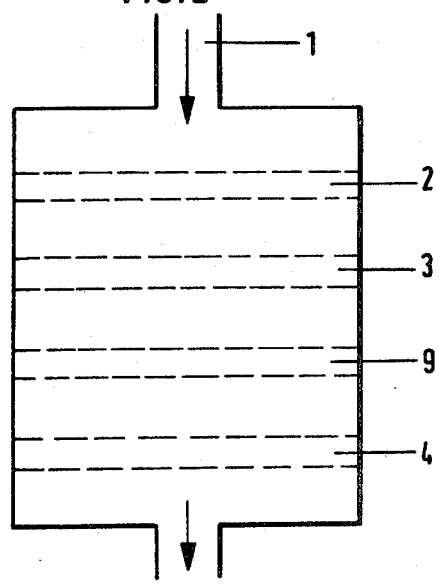

In the embodiments of FIGS. 1 to 3 the air 1 loaded with pollutants such as sulfur dioxide, nitrogen dioxide, nitrogen monoxide and hydrocarbon compounds is passed initially over a soda-lime layer 2, then through a catalyst layer 3, for example hopcalite or an ozonization layer, and then through the layer 4 of activated carbon. A warming up occurs in the heating device 5, whereupon the air is fed to the hopcalite layer 6. Behind the layer 6 a cooling zone 7 is disposed via which the purified air 8 is fed to the industrial safety cabin or the like.

As can be recognized from FIG. 2, at increased concentration of the pollutants in the air 1, after the passing of the soda-lime layer 2 and the catalyst layer 3 a layer of soda-lime 9 is traversed, which precedes the activated carbon layer 4 for receiving of the acid pollutants.

According to the embodiment of FIG. 3, which serves for air particularly heavy loaded with pollutants, the ozonized air 10 is fed in such that the pollutants such as sulfur dioxide, nitrogen dioxide, nitrogen monoxide and hydrocarbons are transformed into sulfur trioxide and nitrogen dioxide or are respectively bonded and are purified with the hydrocarbon compounds by way of chemisorption masses 1 to 9. The ozonized air is added to the air amount 1 to be cleaned via a by-pass 10 or is provided directly via the ozonizer 11, where the ozonization is performed electrically. The ozonization device 11 is employed depending on the requirements in front of and/or between the sorpton masses, where the pollutants of the air transformed into nitrogen dioxide and carbon dioxide are warmed together with the air before the flowing through the last catalyst layer by way of the heating device 5 such that the hopcalite layer does not become so wet that it is useless as a catalyst and the then purified and heated air is cooled down via a cooling zone 7 to the desired inhaling or room air temperature. Preferably, a Peltier element serves as a heating and cooling unit.

In the embodiment of FIG. 4 there are designated the intake is shown at 12, the first partial heating stage 13 is disposed upstream of the chemisorption masses 14, 15, the second partial heating stage 16 then follows the catalust mass 17 and the cooling channel 18 then follows the the exiting air is represented at 19 and a separating wall at 20.

By way of this apparatus according to the invention shown in the schematic representation, the air entering the process at 12 is heated already at 13 via a heating stage, for example a heat exchanger which is preferably provided as the warm side of a Peltier element. This air thus is heated so much before the entering into the chemisorption masses 14, 15 that a wet saturation of the chemisorption masses is substantially avoided and the relatively dry air is passed over a second partial heating stage 16, which again preferably is provided as the hot side of a Peltier element. From here the air is led to the catalyst masses 17 and is fed to a cooling zone at 18, which cooling zone is preferably provided by the cool sides of the Peltier elements, such that the exiting air at 19 is cooled.

By way of this method in connection with the apparatus for performing the method the assurance is provided that the chemisorption masses and the catalyst masses show substantially higher life times as compared to with being fed with thermally untreated pollutant loaded raw gas amount, and in fact, by setting the right partial pressure ratio according to the requirements of the individual sorption layers. Thus the life times can be increased by a multiple.

Thus the invention arrangement does not represent a particular energy expenditure, since the partial heating of the first stage benefits the second after heating stage and since the cooling power at the same time necessarily imparts to the purified air the desired temperature by way of the Peltier element arrangement.

Figure 5:
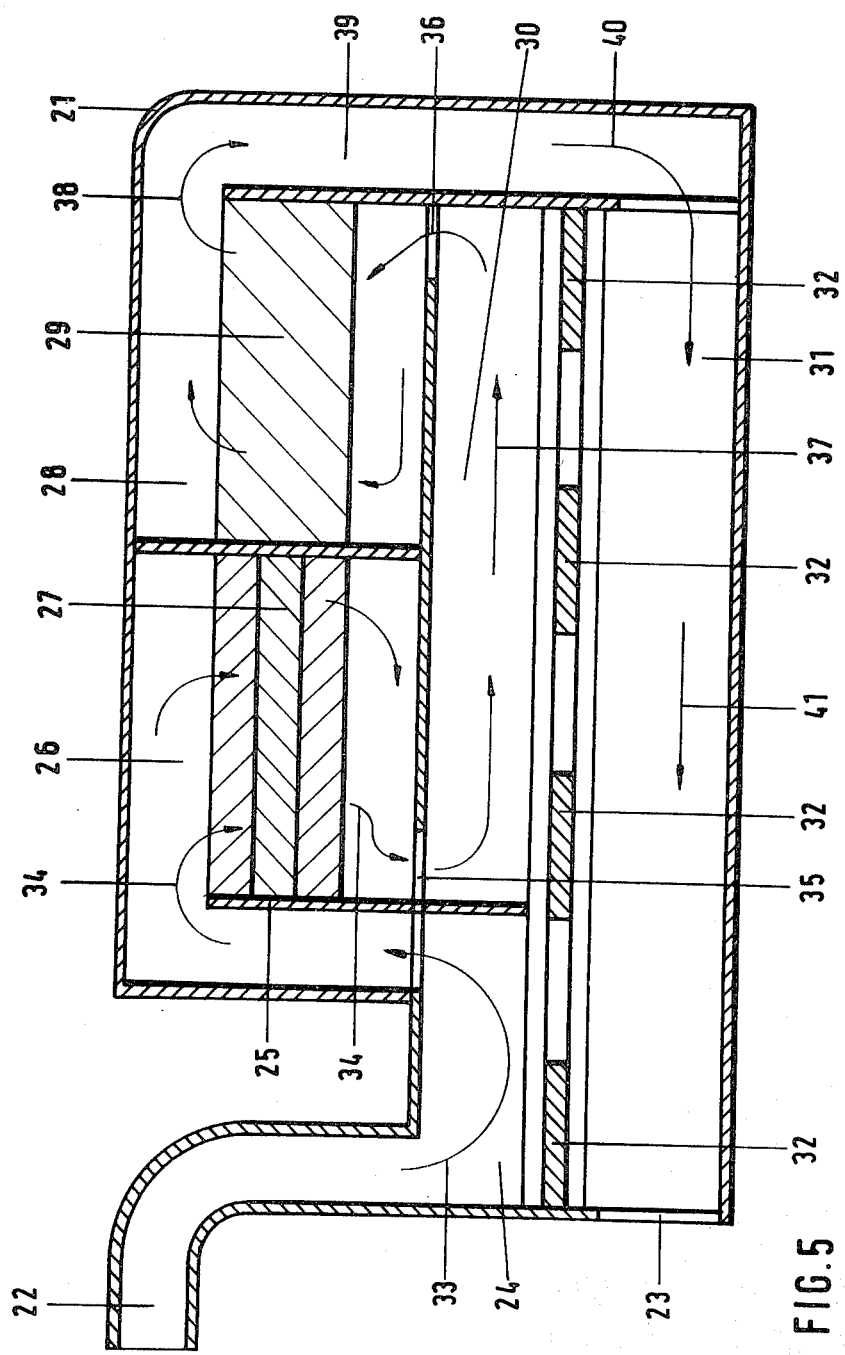
FIG. 5 is a sectional view of a device according to a modified version of FIG. 4.

The embodiment according to FIG. 5 represents a modification of the embodiment according to FIG. 4.

A case is designated as 21 in FIG. 5 and at one side of the case there are disposed the air input 22 as well as the air output 23. An entrance chamber 24 follows to the air input 22 and the entrance chamber is separated by the circulating device 25 from the chamber 26, which serves to hold the sorption masses 27. The chamber 28 is neighboring to the chamber 26 and the chamber 28 contains the catalysts 29. Thus the chambers 26 and 28 form part of the case 21. A heating chamber 30 is provided in another part of the case 21 and the cooling chamber 31 is located immediately neighboring the heating chamber 30.

The heating chamber 30 and the cooling chamber are provided with Peltier elements 32 as heating and cooling devices, which are disposed in a case provided with ribs. One Peltier element 32 extends into the entrance chamber 24.

The mode of operation of the apparatus according to the invention is as follows:

The air fed via the air input 22 at regular outside temperature is slightly warmed up in the entrance chamber 24 by way of a Peltier element 32, for example by 5 to 6 degrees centigrade and passes from the chamber 24, as indicated by the arrow 33 via the circulating device 25 into the entrance region of the chamber 26 and passes over the sorption masses 27 disposed in chamber 26, as is indicated with the arrows 34. The exit opening 35 of the chamber 26 is disposed such, that it is located immediately on the other side of the circulating device 25, such that the air stream leaving the chamber 26 enters into the entrance region of the heating chamber 30. Since the entrance opening 36 of the chamber 28 is disposed at the other end of the heating chamber 30, the heating chamber is passed by the air stream over its full length as indicated by arrow 37 such that the Peltier elements for example heat up the air stream to 55 degrees centigrade. The air passes via the entrance opening 36 into the chamber 28, passes its catalyst masses 29 as indicated by the arrows 38 and passes via channel 39 as indicated with the arrow 40 into the cooling chamber 31, passes through the cooling chamber in its full length, as indicated by arrow 41 such that the air is cooled by the Peltier elements 32 and the air exits to the outside via the exit 23 of the case 21, such that the air is fed to its further use such as for example into an industrial safety cabin or, however, into the cabin of a vehicle and so on.

Figure 6:
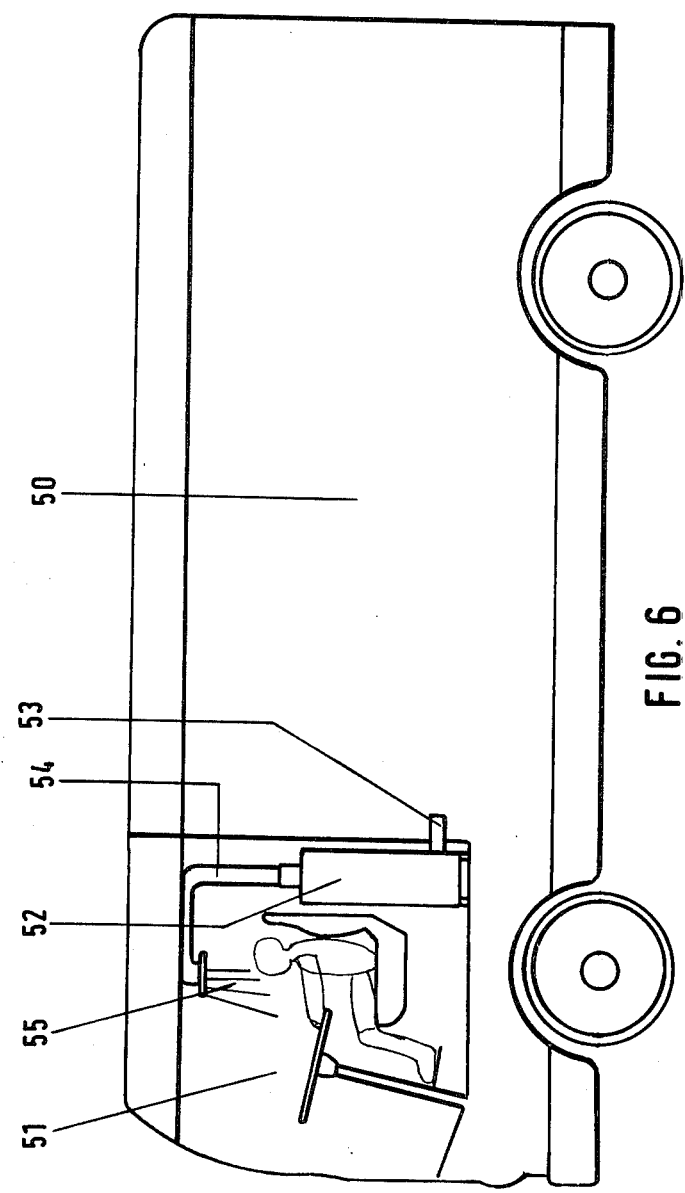
FIG. 6 is a the side view of a large vehicle with driver cabin.

A large vehicle (truck or bus) with driver cabin is shown in FIG. 6. There is designated the large vehicle with 50, the driver cabin with 51, the disposition possibility of a chemisorption filter in the invention region, that is in the inside of the vehicle, with 52 and with 53 a suction connection from the cabin or vehicle region, which suction connection is climatically protected against outside influences.

In this way there is provided the assurance that the regular fresh air feeds warm and cold can remain fully, where the pollutant loaded air feeds for the inhaling region are available with high availability untouched by outside influences by way of the arrangement of the chemisorption filters.

An air feed arrangement into the breathing region is designated with 54 and the exiting purified air stream into the breathing region of the driver is designated with 55.

The invention is not limited to the features of the embodiments described and illustrated in detail above, but numerous changes are possible without deviating from the basic spirit to keep the drivers of large vehicles such as buses, trucks and similar vehicles free from pollutants such as sulfur dioxide, hydrochloric acid HCl, carbon monoxide, hydrocarbon- and $NO_x$-compounds in the inhaling region by employing according to the invention the catalyst and chemisorption filter pack in the inside region of the vehicle protected against negative outside influences, which provides the purified air feed, where air from the interior of the vehicle is employed, which already as desired has been adapted corresponding to the climatic conditions of the total vehicle. By way of this invention arrangement there is further provided the assurance that the regular fresh air feed can be maintained in the amount required, such that no enrichment in carbon dioxide occurs based on the breathing of the passengers.

Figure 7:
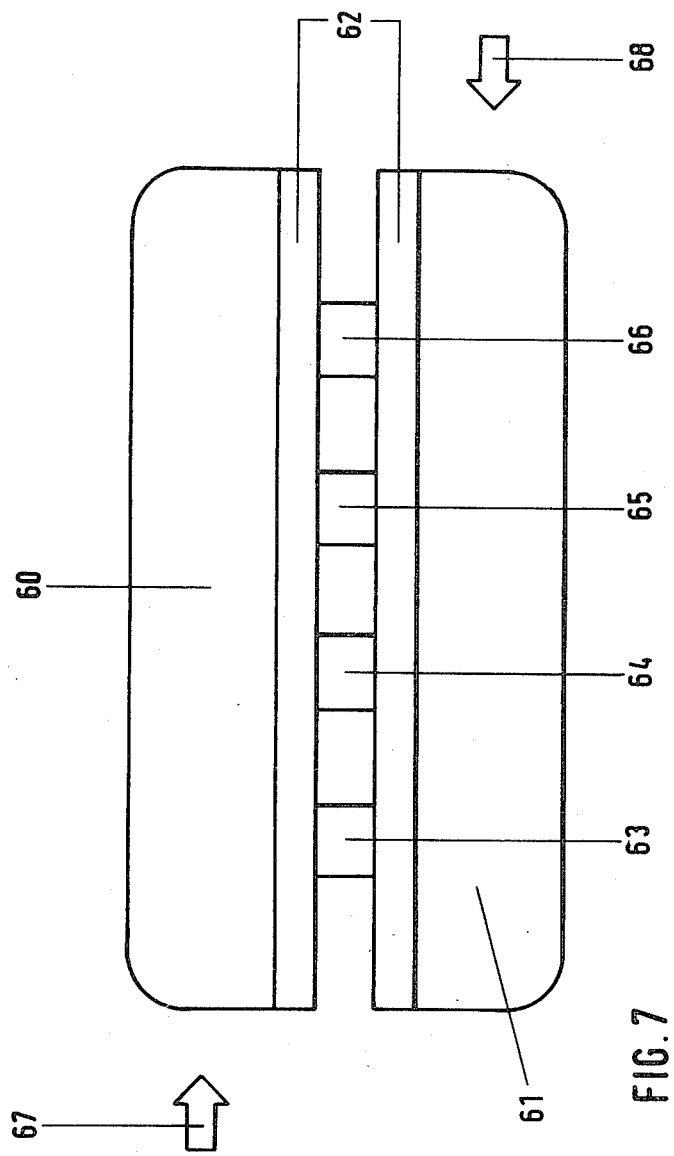
FIG. 7 is a view of an apparatus according to the invention for heating and cooling of the air stream.

A device for heating and cooling of the air to be cleaned is shown in FIG. 7.

The two halves of a case are designated as 60 and 61, which each are provided with ribs 62 for guiding of an air stream as well as for increasing of the surfaces of the case parts 60, 61. The Peltier elements 63, 64, 65, 66 are thermally disposed successively and are located between the case parts. The air stream is guided such that the same, as indicated by arrow 67, is lead successively over the hot sides of the Peltier elements 63, 64, 65, 66 and is then fed back possibly after treatment of the air stream and cooling via the cold sides of the Peltier elements 66, 65, 64, 63 in a counter current as is indicated by arrow 68.

In the embodiment shown the invention apparatus serves as a heat pump, where by way of the arrangement of the Peltier elements 63 to 66 and the guiding of the air stream 67, 68 it is assured that the hottest hot side of the Peltier element 66 is disposed oppositely to the warmest cold side of this element. If for example an air stream is to be heated from 20 degrees centigrade to 60 degrees centigrade, then the same passes with its starting temperature via the Peltier element 63 and experiences for example a heating by 10 degrees centigrade, such that the same leaves the Peltier element 63 with a temperature of 30 degrees centigrade, which at the same time represents the input temperature of the Peltier element 64 and so on. Upon feeding the air stream back, the stream for example meets the cold side of the Peltier element 66 at a temperature of 50 degrees centigrade and experiences a cooling by 10 degrees centigrade such that the air stream passes with a temperature of 40 degrees centigrade onto the cold side of the Peltier element 65 disposed in a counter current and so on, such that overall a cooling by the desired amount is performed.

In the same way the invention apparatus can be employed as a cooling element. In this case the air stream is led just the opposite way, that is the air is initialy passed over the cold side of the Peltier elements 63, 64, 65, 66 and then, if desired, is fed back for heating by way of the hot sides. By way of the thermally successive disposition of the Peltier elements 63 to 66 and the feeding back of the air stream in a counter current there results a substantially improved use of the electrical power and thus a considerable increase in the efficiency.

We claim:

1. An apparatus for cleaning pollutant-laden air to be admitted to a person-occupied enclosure, comprising:
   a partial heating stage traversed by said air for raising the temperature thereof above an incoming-air temperature to a temperature level at which absorption of pollutants from the air is promoted;
   a housing provided with a multilayer gas filter downstream of said partial heating stage, said multilayer gas filter including
      a sorption mass for the absorption of pollutants from the air at said temperature level, and
      a catalyst mass for reaction of other pollutants in said air at a temperature higher than said level to remove said other pollutants, said sorption and catalyst masses being traversed in succession by the air;
   a further heating stage in the path of said air between said masses and upstream of said catalyst mass for heating said air to said temperature higher than said level for reaction in said catalyst mass; and
   cooling means downstream of said filter for cooling the air before it is admitted to said enclosure.

2. The apparatus defined in claim 1 wherein said partial heating stage and said further heating stage are formed by a single Peltier element provided with a partition separating said stages from one another.

3. The apparatus defined in claim 1 wherein said housing has respective chambers for said masses and a further chamber for said further heating stage.

4. The apparatus defined in claim 3, further comprising another chamber in said housing for said partial heating stage.

5. The apparatus defined in claim 4 wherein said housing has an air inlet and an air outlet disposed along a side of the housing.

6. The apparatus defined in claim 3 wherein the chambers for said masses are disposed in one portion of said housing and said chamber for said further heating stage and a chamber for said cooling means are disposed in another portion of said housing adjoining the first mentioned portion.

7. The apparatus defined in claim 6 wherein the housing is provided with an inlet chamber separated from the chamber for said sorption mass by a baffle.

8. The apparatus defined in claim 3 wherein said chamber for said sorption mass communicates with said chamber for said further heating stage such that air flows into the latter over the entire length thereof.

9. The apparatus defined in claim 1 wherein said heating stages and said cooling means are formed by opposite sides of a common Peltier element formed with heat exchanging ribs.

10. The apparatus defined in claim 9 wherein a plurality of such Peltier elements are provided with the air being passed over hot sides of said Peltier elements in succession and then in an opposite direction over the cooling sides of said Peltier elements in succession.

11. The apparatus defined in claim 10 wherein said Peltier elements are disposed in a common housing.

12. The apparatus defined in claim 11 wherein said common housing for said Peltier elements is provided with ribs.

13. The apparatus defined in claim 11 wherein said housing for said Peltier elements is provided with baffles.

14. The apparatus defined in claim 1, further comprising an air bypass provided with an electrically operated ozonator.

15. The apparatus defined in claim 1 wherein said filter comprises a layer of activated carbon followed by a layer of soda-lime and a layer of hopcalite.

* * * * *